United States Patent
Branch et al.

(10) Patent No.: US 10,382,840 B2
(45) Date of Patent: Aug. 13, 2019

(54) WIRELESS ENVIRONMENTAL SENSOR

(71) Applicant: ShockWatch, Inc., Dallas, TX (US)

(72) Inventors: Clinton A. Branch, Graham, TX (US); Byron P. Smith, Graham, TX (US)

(73) Assignee: ShockWatch, Inc., Dallas, TX (US)

(*) Notice: Subject to any disclaimer, the term of this patent is extended or adjusted under 35 U.S.C. 154(b) by 0 days.

(21) Appl. No.: 15/875,870

(22) Filed: Jan. 19, 2018

(65) Prior Publication Data

US 2018/0160201 A1 Jun. 7, 2018

Related U.S. Application Data

(63) Continuation of application No. 15/594,221, filed on May 12, 2017, now Pat. No. 9,877,089.

(60) Provisional application No. 62/391,885, filed on May 13, 2016.

(51) Int. Cl.
- *H04Q 9/02* (2006.01)
- *H04Q 9/00* (2006.01)
- *H04W 76/19* (2018.01)
- *H04W 88/08* (2009.01)

(52) U.S. Cl.
CPC .............. *H04Q 9/00* (2013.01); *H04Q 9/02* (2013.01); *H04W 76/19* (2018.02); *H04Q 2209/40* (2013.01); *H04W 88/08* (2013.01)

(58) Field of Classification Search
CPC ........ H04Q 9/00; H04Q 2209/00; H04Q 9/40; H04Q 9/43; H04Q 9/02
See application file for complete search history.

(56) References Cited

U.S. PATENT DOCUMENTS

| | | |
|---|---|---|
| 2006/0056446 A1 | 3/2006 | Lee et al. |
| 2009/0201850 A1 | 8/2009 | Davis et al. |
| 2013/0110450 A1* | 5/2013 | Kulik ............... G01C 17/38 702/141 |
| 2014/0324527 A1 | 10/2014 | Kulkarni et al. |
| 2015/0097961 A1 | 4/2015 | Ure et al. |
| 2015/0100245 A1 | 4/2015 | Huang et al. |
| 2015/0153807 A1* | 6/2015 | Hao ................. G06F 1/325 713/320 |
| 2015/0160015 A1* | 6/2015 | DeWeese ........... H04W 4/043 701/526 |
| 2015/0179037 A1* | 6/2015 | Ren ................... G01L 7/18 340/522 |
| 2015/0381443 A1 | 12/2015 | Du Plessis |
| 2016/0271480 A1* | 9/2016 | Fukasawa ........ G09B 19/0038 |
| 2017/0180829 A1 | 6/2017 | Schwarzkopf et al. |

FOREIGN PATENT DOCUMENTS

WO 2011129515 10/2011

OTHER PUBLICATIONS

International Search Report and Written Opinion; PCT Application No. PCT/US2017/032498; dated Jul. 24, 2017.

* cited by examiner

*Primary Examiner* — Andrew W Bee
(74) *Attorney, Agent, or Firm* — James L. Baudino

(57) ABSTRACT

A wireless environmental sensor or monitoring device includes a sensor configured to detect an environmental parameter. A radio module is configured to wirelessly communicate data corresponding to the detected environmental parameter to a remote system. The device also includes logic executable by a processor unit to switch the radio module between a wireless access point (AP) operating mode and a wireless client operating mode.

12 Claims, 4 Drawing Sheets

WIRELESS ENVIRONMENTAL SENSOR

BACKGROUND

Environmental sensors such as shock sensors, temperature sensors, humidity sensors, chemical sensors, radiation sensors, and so forth, often are sometimes positioned in places that are not easily accessible and, accordingly, may be connected to monitoring systems using wireless technology. Examples of sensors placed in inaccessible areas monitoring static applications include shock sensors placed on drilling rigs, computer numerical control (CNC) manufacturing equipment, cranes, and so forth. A shock sensing unit may be remotely mounted on a piece of equipment and provided with external power. The remote unit then has a wireless connection to a network or base station also known as an access point. Typically the remote environmental sensor uses a Wi-Fi radio that may be similar to those found in a cell phone or laptop computer. In normal operation, the radio on the environmental sensor wirelessly reports or communicates monitored or collected data to a server or remote access point.

BRIEF SUMMARY

According to one aspect of the present disclosure, a wireless environmental sensor or monitoring device includes a processor unit, a monitor module for monitoring and collecting data corresponding to an environmental parameter, a radio module configured to enable wireless communication of the data to a remote system, and logic executable by the processor unit to: monitor wireless communication connectivity between the radio module and the remote system; and responsive to detecting a loss of wireless communication connectivity with the remote system, automatically enable a wireless access point (AP) mode of the radio module to initiate a broadcast of a local wireless network identifier to enable a client device to wirelessly locate and connect to the sensor device.

According to another embodiment of the present disclosure, a method and technique for wireless connectivity monitoring and resolution for a wireless environmental monitoring or sensor device includes: monitoring and collecting, by an environmental sensor device, data corresponding to an environmental parameter; wirelessly communicating the data from the environmental sensor device to a remote system; monitoring, by the environmental sensor device, wireless communication connectivity with the remote system; and responsive to detecting a loss of wireless communication connectivity with the remote system, automatically enabling a wireless access point (AP) mode of a radio module of the environmental sensor device to initiate a broadcast of a local wireless network identifier to enable a client device to wirelessly locate and connect to the environmental sensor device.

According to yet another embodiment of the present disclosure, a wireless environmental monitoring or sensor device includes a processor unit, a monitor module for monitoring and collecting data corresponding to an environmental parameter, a radio module configured to enable wireless communication of the data to a remote system, and logic executable by the processor unit to: determine a change from local power source to a remote power source for powering the sensor device; and responsive to detecting the change, switch the monitor module to a second operating parameter mode for monitoring the environmental parameter according to a second setting.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which.

DETAILED DESCRIPTION

Figure 1:
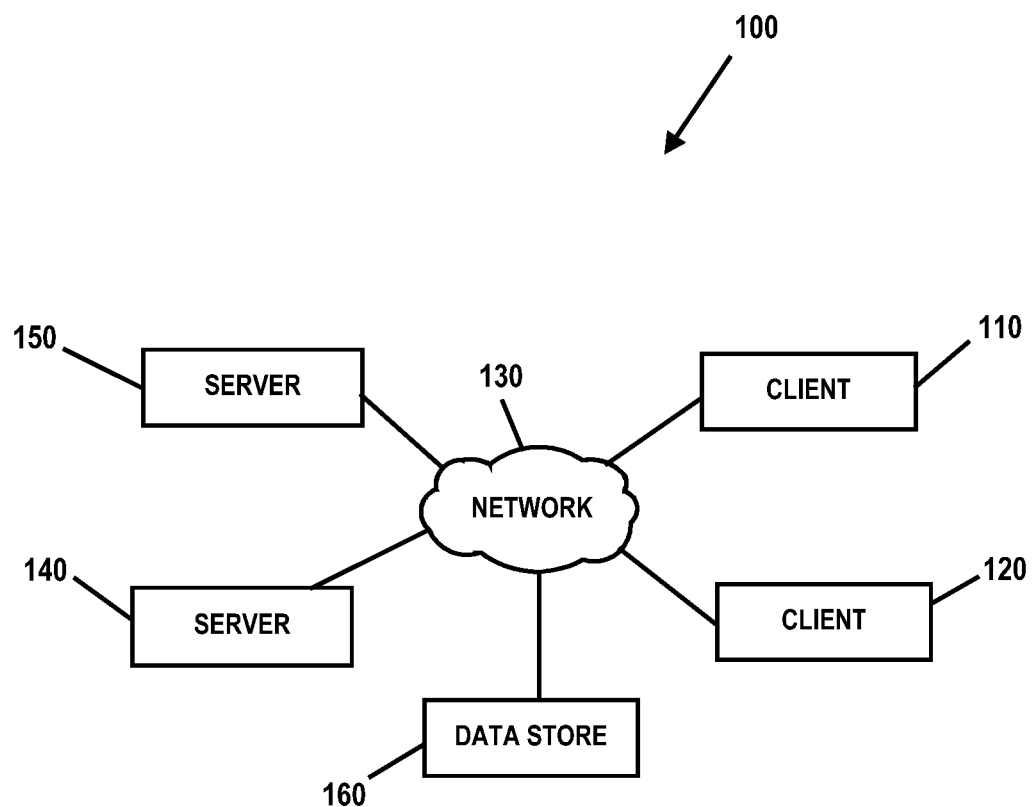
FIG. 1 is an embodiment of a network of data processing systems in which the illustrative embodiments of the present disclosure may be implemented.

Embodiments of the present disclosure provide a wireless environmental monitoring or sensor device that monitors its wireless connection to a remote network and, if that connectivity is lost or otherwise becomes disconnected, the device automatically toggles to a mode where it functions as a wireless access point to enable another device to access its wireless configuration settings. Thus, the device can have its wireless connection to a remote system for data offload reestablished remotely without the need for manually changing the network configuration of the Wi-Fi radio of the device. Embodiments of the present disclosure also use the power mode as a proxy for where the sensor assembly may be and what it is monitoring. Depending on the power source, the device can automatically change it monitoring operating parameters.

As will be appreciated by one skilled in the art, aspects of the present disclosure may be embodied as a system/device/apparatus, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer usable or computer readable medium(s) may be utilized. The computer readable medium may be a computer readable signal medium or a computer readable storage medium. A computer readable storage medium may be, for example but not limited to, an electronic, magnetic, optical, electromagnetic, infrared, or semiconductor system, apparatus, or device, or any suitable combination of the foregoing. More specific examples may include a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with and instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure as described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
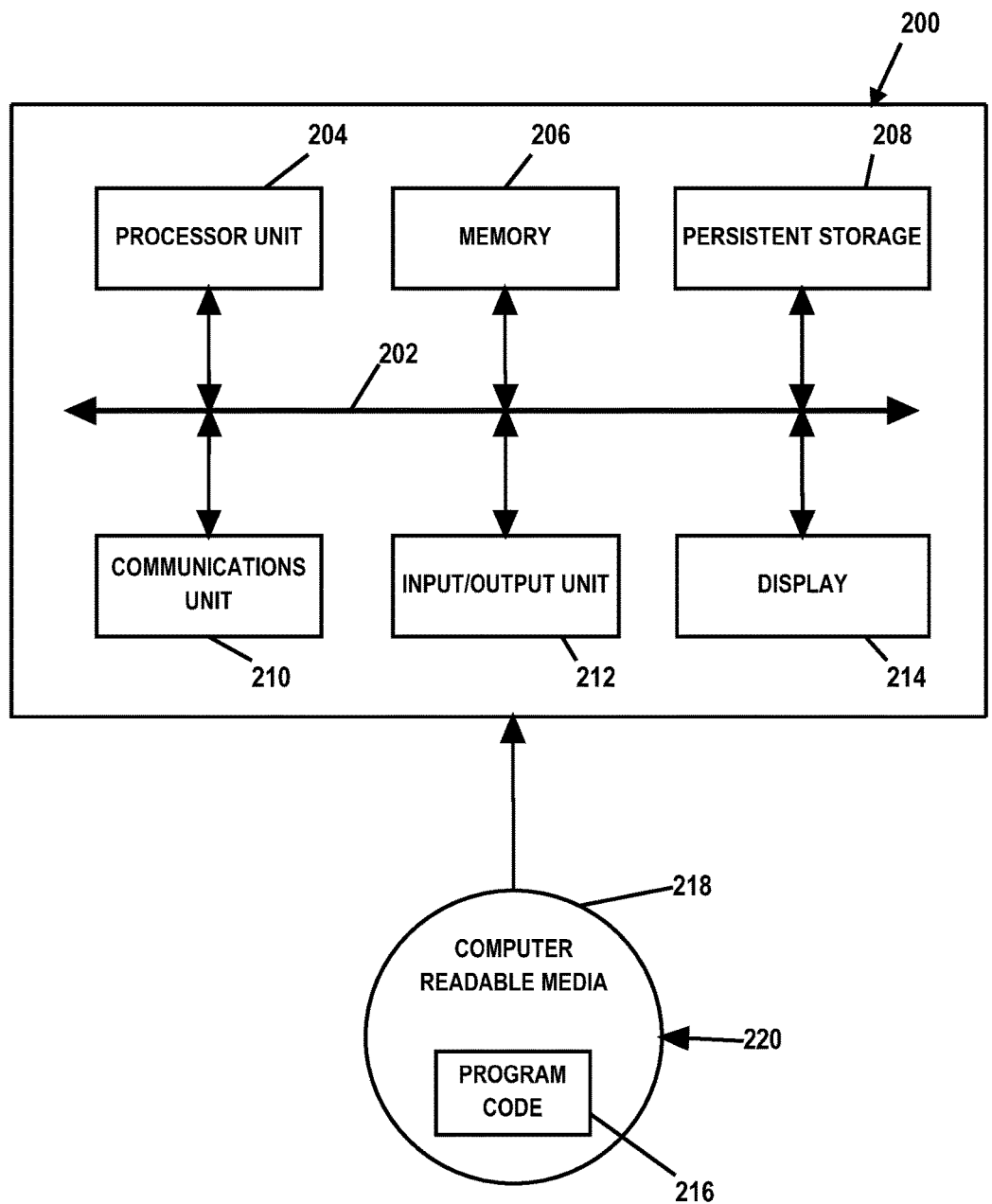
FIG. 2 is an embodiment of a data processing system in which the illustrative embodiments of the present disclosure may be implemented.

With reference now to the Figures and in particular with reference to FIGS. 1-2, exemplary diagrams of data processing environments are provided in which illustrative embodiments of the present disclosure may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a pictorial representation of a network of data processing systems in which illustrative embodiments of the present disclosure may be implemented. Network data processing system 100 is a network of computers in which the illustrative embodiments of the present disclosure may be implemented. Network data processing system 100 contains network 130, which is the medium used to provide communications links between various devices and computers connected together within network data processing system 100. Network 130 may include connections, such as wire, wireless communication links, or fiber optic cables.

In some embodiments, server 140 and server 150 connect to network 130 along with data store 160. In addition, clients 110 and 120 connect to network 130. Clients 110 and 120 may be, for example, personal computers or network computers. In the depicted example, server 140 provides data and/or services such as, but not limited to, data files, operating system images, and applications to clients 110 and 120. Network data processing system 100 may include additional servers, clients, and other devices.

In the depicted example, network data processing system 100 is the Internet with network 130 representing a worldwide collection of networks and gateways to communicate with one another. Network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is an embodiment of a data processing system 200 such as, but not limited to, client 110 and/or server 140 in which an embodiment of an access authentication system according to the present disclosure may be implemented. In this embodiment, data processing system 200 includes a bus or communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The media used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable media 218 are examples of storage devices in a tangible form.

Figure 3:
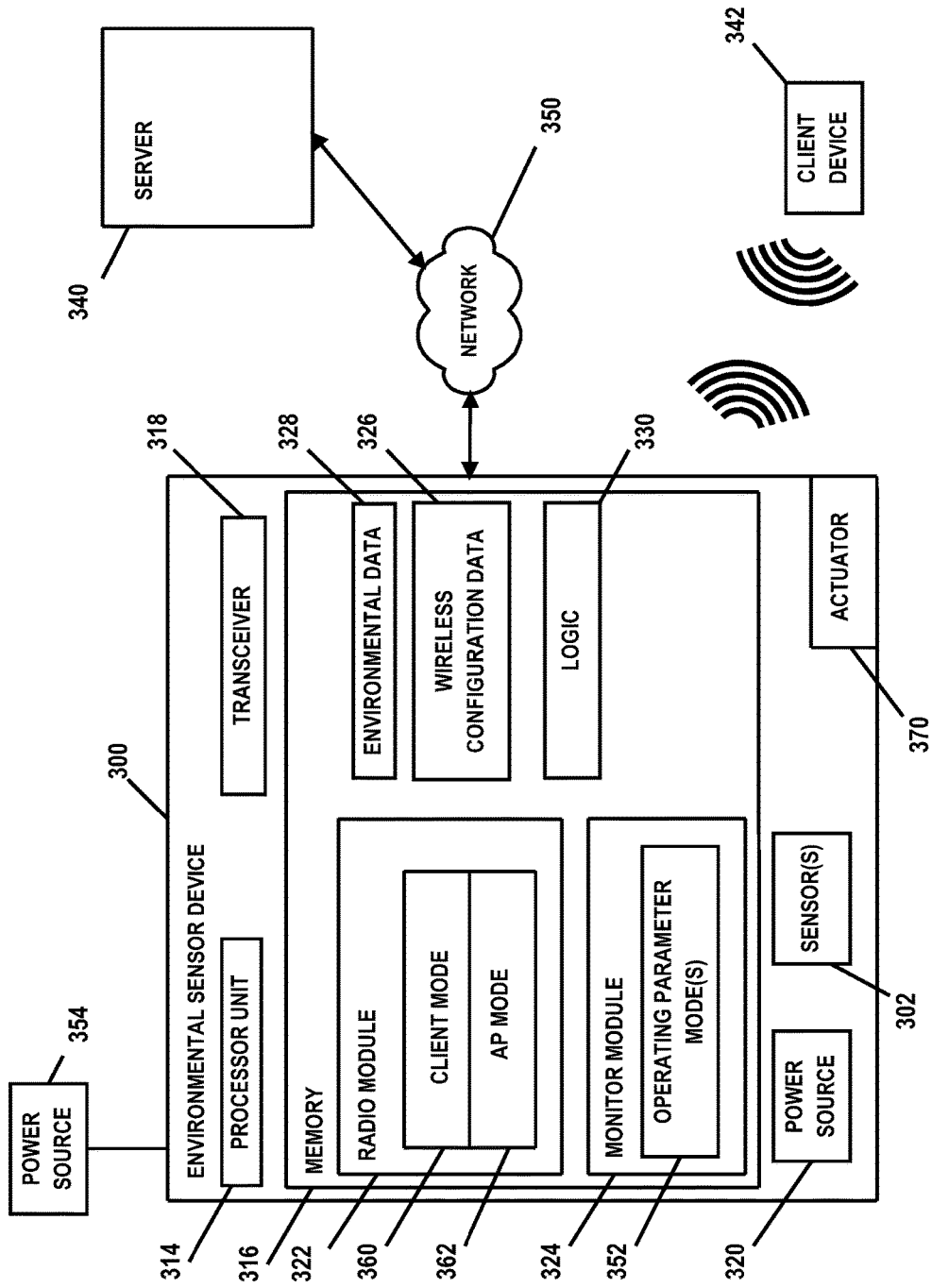
FIG. 3 is a diagram illustrating an embodiment of a wireless environmental sensor device in which illustrative embodiments of the present disclosure may be implemented.

FIG. 3 is a diagram illustrating an embodiment of an environmental sensor device 300 in accordance with the present disclosure. Device 300 is configured to monitor one or more environmental parameters encountered or experienced by an object to which it is attached, mounted, or otherwise associated. For example, device 300 may comprise a shock sensor, temperature sensor, humidity sensor, chemical sensor, radiation sensor, or a combination thereof, or other type of sensor for monitoring a desired environmental parameter(s).

In the embodiment illustrated in FIG. 3, device 300 comprises a data processing system having a processor unit 314, a storage resource or memory 316, a transceiver 318, and a local or onboard power source 320. Device 300 also includes one or more environmental sensors 302 for detecting and/or monitoring various environmental parameters (e.g., shock sensor, temperature sensor, humidity sensor, etc.). Transceiver 318 may be used to facilitate wireless communications between device 300 and other systems/devices. Power source 320 may comprise a battery located on, within, and/or otherwise configured as part of device 300 for supplying power to various operational components of device 300. In the embodiment illustrated in FIG. 3, memory 316 comprises a radio module 322, a monitor module 324, wireless configuration data 326, environmental data 328, and logic 330. In FIG. 3, radio module 322, monitor module 324, and logic 330 are illustrated as a software program residing in memory 316 and executable by processor unit 314. However, it should be understood that radio module 322, monitor module 324, and/or logic 330 may comprise software, logic and/or executable code for performing various functions as described herein (e.g., residing as software and/or an algorithm running on a processor unit, hardware logic residing in a processor or other type of logic chip, centralized in a single integrated circuit or distributed among different chips in a data processing system).

Radio module 322 performs various operations associated with wireless communications between device 300 and other devices and/systems. For example, in the embodiment illustrated in FIG. 3, device 300 may communicate wirelessly with other remote data processing systems such as a server 340 and a client device 342. Wireless configuration data 326 may comprise various types of information and/or settings associated with radio module 322 and/or transceiver 318 for the wireless communications and/or connections of device 300. For example, wireless configuration data 326 may comprise information associated with connected and/or associated wireless networks that device 300 may be connected to (e.g., a wireless network 350 associated with server 340), authentication and/or encryption mechanisms, network name/identifiers, etc.

Monitor module 324 performs various operations associated with the environmental parameter monitoring operations and processes performed by device 300. For example, monitor module 324 may be configured to cause device to monitor, store and/or analyze various environmental sensor input signals associated with sensor(s) 302. In the embodiment illustrated in FIG. 3, monitor module includes operating parameter mode(s) 352. Mode(s) 352 may comprise one or more settings and/or operational characteristics for respectively different monitoring modes for device 300. For example, in some embodiments, one mode 352 may be used while device 300 is being powered by power source 320 while a different mode 352 may be used while being powered by an external power source 354. As an example, consider device 300 being configured to monitor for shock events. Device 300 may initially be configured to operate according to a first mode 354 that monitors for shock events at a particular shock frequency using a first set of screening or filtering parameters. This first mode 354 may be used while device 300 is attached to an object while that object is being transported to an intended destination. During this transportation, device 300 is powered by power source 320. The object to which device 300 is associated may then be installed in a particular application, and device 300 may be connected to power source 354 for a long-term monitoring application. The monitoring parameters for the installed application may differ from the monitoring parameters during transportation such that a different shock monitoring frequency may be applicable to the installation application as well as a different set of screening or filtering aspects. It should be understood that different modes 352 may also be used for other circumstances (e.g., other than being contingent on a power source), such as different operating parameters according to a user's particular application, different frequencies of data collection at different periods of time, etc. The information acquired or collected using sensor(s) 302 and monitor module 324 may be stored as environmental data 328.

In the illustrated embodiment, radio module 322 includes a wireless client mode 360 and a wireless access point (AP) mode 362. In client mode 360, device 300 is wirelessly connected to a remote system, such as server 340, via network 350. For example, a user of device 300 may access and/or set configuration data 326 so as to wirelessly connect to and/or associate device 300 with network 350 to facilitate the wireless communication of data 328 to server 340 to enable access to and/or evaluation of data 328 via server 340. Thus, in client mode 360, server 340 functions as a wireless access point where device 300 connects to server 340's network 350 to report data 328 to server 340. In AP mode 362, device 300 is configured to function as a wireless access point such that radio module 322/transceiver 318 functions as a networking hardware device that allows a Wi-Fi compliant device (e.g., client device 342) to connect to device 300. For example, in AP mode 362, radio module 322 may cause a Service Set Identifier (SSID) to be broadcast identifying a wireless network provided by device 300. Thus, in AP mode 362, when a wireless device (e.g., client device 342) searches the area for wireless networks, client device 342 will detect the SSID of device 300 to enable client device 342 to associate with or wirelessly connect to device 300. Client device 342 may then access configuration data 326 (e.g., downloading and/or logging into an internal configuration web page of device 300 using a browser on client device 342) to set or modify wireless communication/network settings to enable device 300 to be wirelessly connected to network 350 or alter/set/modify other types of wireless configuration information.

Logic 330 may be used to perform various monitoring functions and cause certain functions of device 300 to be invoked or ceased based on the monitored conditions. In the illustrated embodiment, logic 330 is depicted separate and apart from radio module 322 and monitor module 324; however, it should be understood that various functions, code, and/or circuitry associated with logic 330 may be incorporated in and/or be part of radio module 322 and/or monitor module 324 (and transceiver 318). In some embodiments, logic 330 is configured to monitor for wireless connectivity of device 300 with a remote system (e.g., server 340). For example, logic 330 may be configured to perform heartbeat monitoring or other types of packet or signal loss analysis techniques to determine whether a wireless connection as a client to another network (e.g., network 350 of server 340) has been lost or disconnected. In response to detecting a loss of wireless connectivity of device 300 as a client to another access point or wireless network (e.g., network 350 of server 340), logic 330 causes AP mode 362 to be automatically initiated for radio module 322 to enable device 300 to serve as an access point, thereby enabling the wireless connectivity issue to be evaluated and/or modified.

For example, in some embodiments, logic 330 may be configured to monitor for lost wireless connectivity to network 350 and, after some threshold period of time of an indicated lost wireless connection to network 350, radio module 322 is automatically placed into AP mode 362 to enable client device 342 to wirelessly connect to device 300 and access configuration data 326. In this manner, client device 342 enables a user of device 300 to access configuration data 326 to correct any configuration settings to enable device 300 to re-connect to network 350, change configuration settings to enable device 300 to connect to a new/different remote wireless network for exporting data 328 thereto, or perform other wireless configuration functions. In some embodiments, in response to a completion or confirmation of changes to configuration data 326, logic 330 may automatically cause radio module 322 to switch to client mode 360 to reestablish a wireless connection as a client to network 350 (or another wireless network) for sharing/exporting data 328, thereby ceasing the providing of a wireless network as an access point and the cessation of any SSID broadcast. In some embodiments, in response to logic 330 detecting that device 300 has established a wireless connection to a remote network as a client (as opposed to functioning as an access point), logic 330 may cause radio module 322 to case the AP mode 362 and be automatically placed or returned to client mode 360, thereby ceasing the providing of a wireless network as an access point and the cessation of any SSID broadcast.

Thus, in some embodiments, in normal operation, radio module 322 of device 300 operates as a client (e.g., client mode 360) where device 300 reports or exports data 328 to a software server or access point (e.g., server 340 via wireless network 350). However, if device 300 is located or used in an application where device 300 is difficult to access (e.g., the top drive of a drilling rig), a loss of wireless connectivity may be problematic (e.g., such as if the access point changes a network configuration, thereby causing the wireless connection of device 300 to a remote network for data 328 exportation to be lost). In this example, a user may have to attempt to reestablish a wireless connection by climbing up to the drilling rig and manually reconnecting device 300 to the access point (or another access point). Accordingly, embodiments of the present disclosure enable radio module 322 and/or logic 330 to output a status signal/message regarding its wireless connection to a Wi-Fi access point (e.g., server 340 via network 350). If the wireless connection is lost for some period of time (e.g., 30 minutes or more) logic 330 may cause radio module 322 to automatically toggle to AP mode 362. When device 300 is in AP mode 362, client device 342 remote from device 300 can connect to device 300 and log into the device 300's internal configuration webpage (e.g., by opening a browser and having the client device 342 navigate to a specific address associated with device 300), thereby enabling changes to be made to radio module 322 (e.g., configuration data 326) so radio module 322 can connect back to the Wi-Fi network that is collecting data 328 from device 300. Accordingly, this feature eliminates someone having to physically access device 300 to make any necessary wireless configuration setting changes. An example of a Wi-Fi radio that can operate in both client mode or host/AP mode is the ACKme Networks™ Radio # AMW006. In some embodiments, radio module 322 may be manually placed into AP mode 362 by a user physically depressing a button, switch or actuator 370.

Logic 330 may be configured to monitor for a particular power mode as a proxy for where device 300 may be and what device 300 is monitoring. For example, in some embodiments, logic 330 is configured to detect whether device 300 is being powered from local power source 320 or remote power source 354. Depending on the mode for powering device 300, logic 330 may cause monitor module 324 to invoke different operating parameter modes 352 (e.g., the mode of powering device 300 being an indication of the particular operating parameters that device 300 should be operating under and/or the monitoring parameter criteria it should be using). In some embodiments, in response to logic 322 detecting that device 300 is being powered by remote power source 354, logic 322 may automatically cause monitor module 324 to switch from a first operating parameter mode 352 to a second operating parameter mode 352 where each has a different set or criteria of monitoring aspects. The reverse may also be configured for logic 330 (e.g., switching from a first mode 352 to a second mode 352 in response to detecting power from power source 320).

As an example, consider that, initially, device 300 is operating under power from power source 320 (e.g., an onboard battery). Logic 330 is configured to cause monitor module 324 to initially operate according to a first operating parameter mode 352 where a certain sensing range, sampling rate, and/or filtering frequency is used when monitoring for a particular environmental parameter. In this initial operating phase, logic 330 may be configured such that this first mode 352 is used during a transportation phase of the object to which device 300 is associated. Upon the object reaching its final destination/installation, device 300 may be connected to external power source 354 (e.g., for a longer operational period). Logic 330 is configured to detect a change from power source 320 to power source 354 and, in response thereto, cause monitor module to switch to a second mode 352 where different sensing range, sampling rate, and/or filtering frequency is used when monitoring for a particular environmental parameter.

For example, a single or particular device 300 may be used in different operating environments. If device 300 is a shock sensor, for example, device 300 might be placed on a top drive that is being transported to a well site to be placed on a wellhead. During the transportation of the top drive, the unit weighs a couple of orders of magnitude less (e.g. ~10,000 pounds) when compared to the top drive as an integral part of the wellhead itself (e.g. ~1,000,000 pounds). These differences in the structure or object to be monitored by device 300 require changes in how device 300 operates. For example it may be desirable to have different monitoring frequencies and different shock screening parameters for the different phases experienced by an object to which device 300 is associated. In the above example, when a shock sensor is attached to the top drive of a wellhead before the top drive is installed at the well site, the top drive may be transported via land and sea out to the rig. When the top drive is being transported to the well site, its dynamic profile is of an item that weighs about 10,000 pounds. For this scenario, specific G ranges and filter criteria are required to get the best recording of any impacts that it may encounter during transportation. However, when the top drive arrives at the rig and is installed, it becomes part of a much different dynamic profile. The top drive is now part of a 1,000,000+ pound environment where a different set of G-ranges and filters need to be used. Accordingly, the power source (e.g., either DC battery power or external AC power) can be used as proxy for the current status and/or location of device 300. For example, when device 300 on the top drive is operating in transit, device 300 would be using internal power source 320 (e.g., a DC battery). When device 300 begins using external power source 354 (e.g., AC power), it is presumed that device 300 is no longer in transit and, instead, is in a static environment after being installed on the wellhead. Thus, in some embodiments, logic 330 may be configured to detect changes between operation under DC or AC power and automatically change the operating parameters (e.g., G-ranges, filters and monitoring frequency) based upon this power source determination.

Figure 4:
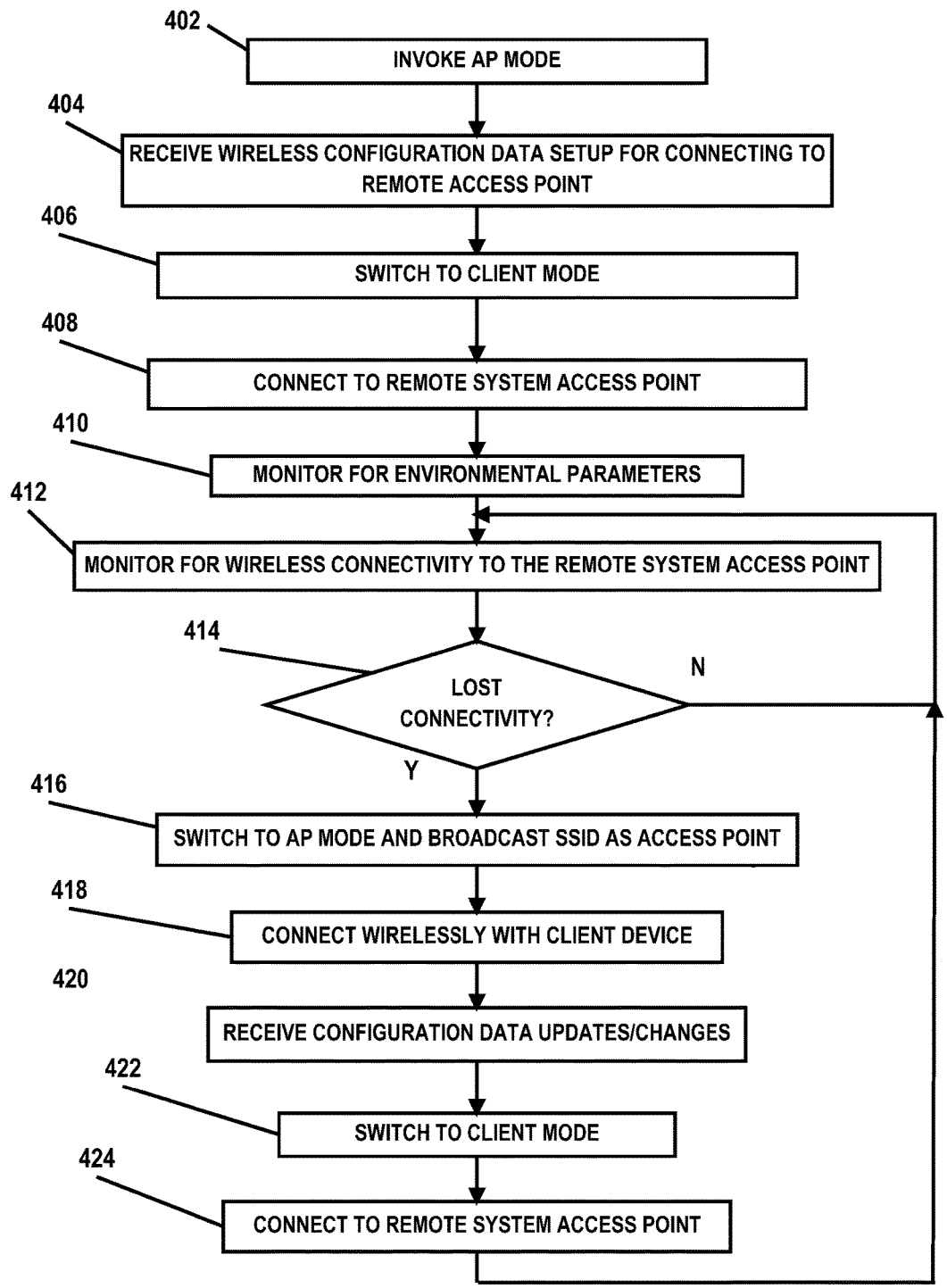
FIG. 4 is a flow diagram illustrating an embodiment of a method for wireless connectivity monitoring and resolution according to the present disclosure.

FIG. 4 is a flow diagram illustrating an embodiment of a method for wireless connectivity monitoring and resolution of a wireless environmental sensor device according to the present disclosure. The method begins at block 402, where an AP mode 362 of radio module 322 for device 300 is invoked. For example, in some embodiments, actuator 370 may be initially activated so as to enable client device 342 to access configuration data 326 to set initial wireless configuration settings. At block 404, device 300 receives setup information for configuration data 326 to enable device 300 to wirelessly connect as a client to a remote access point (e.g., network 350 of server 340) to enable the export of data 328 thereto. At block 406, radio module 322 is switched from AP mode 362 to client mode 360. At block 408, radio module 322 wirelessly connects to the remote system access point.

At block 410, monitor module 320 monitors and collects environmental data 328 corresponding to environmental parameters set by one or more operating parameter modes 352. At block 412, logic 330 monitors for wireless connectivity of device 300 with the remote system access point (e.g., network 350 of server 340). At decisional block 414, logic 330 determines whether a loss of wireless connectivity has occurred relative to the remote access point (e.g., network 350 of server 340). If not, the method proceeds to block 412 where logic 330 continues to monitor the status of the wireless connectivity to the remote system access point. At decisional block 414, if a determination is made that there has been a loss of wireless connectivity to the remote access point (e.g., network 350 of server 340), the method proceeds to block 416 where logic 330 (immediately or after some threshold or predetermined time period of elapsed time of continued connectivity loss) causes radio module 322 to switch from client mode 360 to AP mode 362 (e.g., where device 300 performs as a wireless network access point and begins broadcasting its SSID information).

At block 418, radio module 322 receives a wireless connection with client device 342 (e.g., via a user locating and connecting with the wireless network provided by device 300). At block 420, radio module 322 receives and stores any changes or modification to wireless configuration data 326 made by a user of client device 342. At block 422, upon the completion and/or confirmation of access/changes to wireless configuration data 422 by a user via client device 342, radio module 322 is automatically switched from AP mode 362 to client mode 360, thereby ceasing the use of device 300 as a wireless access point and the cessation of any broadcast of any SSID network information by device 300. At block 424, radio module 322 attempts to and/or connects with a remote wireless network access point as defined in the configuration data 326 settings (e.g., a new network for exporting data 328 and/or a re-connection with network 350). The method then proceeds to block 412 where logic 330 continues to monitor the connectivity status of device 300 to a remote system network for providing data 328 thereto.

Thus, embodiments of the present disclosure enable a wireless environmental sensor device to monitor its wireless connection to a remote network and, if that connectivity is lost or otherwise becomes disconnected, the device automatically toggles to a mode where it functions as a wireless access point to enable another device to access its wireless configuration settings. Thus, the device can have its wireless connection to a remote system for data offload reestablished remotely without the need for manually changing the network configuration of the Wi-Fi radio of the device. Embodiments of the present disclosure also use the power mode as a proxy for where the sensor assembly may be and what it is monitoring. Depending on the power source, the device can automatically change it monitoring operating parameters.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A device, comprising:
a sensor;
a monitor module for monitoring and collecting data corresponding to an environmental parameter detected by the sensor;
a radio module configured to enable wireless communication of the data to a remote system; and
wherein the monitor module is configured to:
operate in a first operating parameter mode according to a first setting for monitoring the environmental parameter while the device is mobile; and
operate in a second operating parameter mode according to a second setting for monitoring the environmental parameter while the device is stationary; and
wherein the first setting monitors for a shock frequency different than a shock frequency defined by the second setting.

2. The device of claim 1, further comprising logic executable by a processor unit to monitor wireless communication connectivity with the remote system.

3. The device of claim 2, wherein the logic is executable to, responsive to detecting a loss of wireless communication connectivity with the remote system, automatically enable the radio module to operate as a wireless access point.

4. The device of claim 3, wherein the logic is executable to enable wireless configuration settings of the radio module to be modified by a client device while operating as a wireless access point.

5. The device of claim 1, further comprising an input device configured to be physically actuated to enable the radio module to operate as a wireless access point.

6. The device of claim 1, wherein the monitor module is configured to determine whether to operate in the first or second operating parameter mode based on a power supply powering the device.

7. A method, comprising:
monitoring and collecting, by a sensor device, data corresponding to an environmental parameter; and
wirelessly communicating the data from the sensor device to a remote system; and
wherein the monitoring includes:
monitoring the environmental parameter while the device is mobile in a first operating parameter mode according to a first setting; and
monitoring the environmental parameter while the device is stationary in a second operating parameter mode according to a second setting; and
wherein monitoring according to the first setting monitors for a shock frequency different than a shock frequency defined by the second setting.

8. The method of claim 7, further comprising monitoring wireless communication connectivity with the remote system.

9. The method of claim 8, further comprising, responsive to detecting a loss of wireless communication connectivity with the remote system, automatically enable a radio module of the sensor device to operate as a wireless access point.

10. The method of claim 9, further comprising enabling wireless configuration settings of the radio module to be modified by a client device while operating as a wireless access point.

11. The method of claim 7, further comprising receiving an input by the sensor device to enable a radio module of the sensor device to operate as a wireless access point.

12. The method of claim 7, further comprising determining whether to operate in the first or second operating parameter mode based on a power supply powering the device.

* * * * *